(12) United States Patent
Tirén

(10) Patent No.: US 10,836,655 B2
(45) Date of Patent: Nov. 17, 2020

(54) SYSTEM FOR UV LIGHT TREATMENT OF A FLUID

(71) Applicant: Lightlab Sweden AB, Uppsala (SE)

(72) Inventor: Jonas Tirén, Uppsala (SE)

(73) Assignee: Lightlab Sweden AB, Uppsala (SE)

( * ) Notice: Subject to any disclaimer, the term of this patent is extended or adjusted under 35 U.S.C. 154(b) by 0 days.

(21) Appl. No.: 15/736,632

(22) PCT Filed: Jun. 20, 2016

(86) PCT No.: PCT/SE2016/050595
§ 371 (c)(1),
(2) Date: Dec. 14, 2017

(87) PCT Pub. No.: WO2017/003347
PCT Pub. Date: Jan. 5, 2017

(65) Prior Publication Data
US 2018/0179087 A1    Jun. 28, 2018

(30) Foreign Application Priority Data
Jun. 30, 2015    (SE) ...................................... 1550920

(51) Int. Cl.
*C02F 1/74*        (2006.01)
*C02F 1/32*        (2006.01)

(52) U.S. Cl.
CPC ............... *C02F 1/325* (2013.01); *C02F 1/32* (2013.01); *C02F 2201/326* (2013.01);
(Continued)

(58) Field of Classification Search
USPC ................................................. 250/455.11
See application file for complete search history.

(56) References Cited

U.S. PATENT DOCUMENTS 4,336,223 A * 6/1982 Hillman ..................... A61L 2/10
                                                            210/103
6,972,415 B2 * 12/2005 Schaible .................. A61L 2/10
                                                            210/748.11
(Continued)

FOREIGN PATENT DOCUMENTS

FR          2949458 A1    3/2011
WO       2014194404 A1    12/2014

OTHER PUBLICATIONS

International Search Report and Written Opinion for International Application No. PCT/SE2016/050595 dated Aug. 31, 2016, 15 pages.

*Primary Examiner* — Phillip A Johnston
(74) *Attorney, Agent, or Firm* — RMCK Law Group, PLC

(57) ABSTRACT

The present invention generally relates to a system for treating a fluid and specifically to a treatment system (200) configured for selectively activating a first (206) and a second UV light source (104). The aim of the invention is to reduce the effective energy consumption of a system for treating a fluid with UV light. The invention especially concerns to overcome the drawback with mercury light sources, which do not turn on immediately. Only the second UV light source (104) is an UV mercury based light source and the electrical power supply is configured to selectively deactivate the first UV light source (206) based on a predetermined condition based on a warm-up period for the second light source.

10 Claims, 4 Drawing Sheets

(52) U.S. Cl.
CPC .............. *C02F 2201/3222* (2013.01); *C02F 2201/3227* (2013.01); *C02F 2209/005* (2013.01); *C02F 2303/04* (2013.01)

(56) References Cited

U.S. PATENT DOCUMENTS

| | | | | |
|---|---|---|---|---|
| 6,986,867 | B2 * | 1/2006 | Hanley | A61L 2/0011 |
| | | | | 422/22 |
| 7,175,808 | B2 * | 2/2007 | Gunn | A61L 2/0011 |
| | | | | 210/748.11 |
| 7,507,973 | B2 * | 3/2009 | Birchen | C02F 1/325 |
| | | | | 250/453.11 |
| 7,884,335 | B2 * | 2/2011 | Hallam | C02F 1/325 |
| | | | | 210/748.08 |
| 8,475,725 | B1 | 7/2013 | Antipenko et al. | |
| 9,187,344 | B2 * | 11/2015 | Kolstad | C02F 1/78 |
| 2003/0170151 | A1 | 9/2003 | Hunter et al. | |
| 2010/0209294 | A1 | 8/2010 | Owen et al. | |
| 2015/0008167 | A1 | 1/2015 | Shturm et al. | |

\* cited by examiner

SYSTEM FOR UV LIGHT TREATMENT OF A FLUID

CROSS-REFERENCE TO RELATED APPLICATIONS

This application is a 371 U.S. National Stage of International Application No. PCT/SE2016/050595, filed Jun. 20, 2016, which claims priority to Swedish Application No. 1550920-1, filed on Jun. 30, 2015. The disclosures of each of the above applications are incorporated herein by reference in their entirety.

TECHNICAL FIELD

The present invention generally relates to a system for treating a fluid and specifically to a treatment system configured for selectively activating a first and a second UV light source.

BACKGROUND OF THE INVENTION

Subsystems for disinfection of water, air, surfaces or certain equipment using ultraviolet (UV) light in the range of 200-300 nm are commonly used today. These systems may be combined with filtering, reverse osmosis (for water disinfection) and other. The systems are popular since they do not use any chemicals (e.g. chlorine), which is advantageous for many reason, environmental not the least.

These systems are almost solely using mercury light sources (Hg light sources) of various kinds. These light sources work well, can have a good energy efficiency and have lifetimes that for the best products today, are well above 10 000 hours; 16 000 hours is reported for the best products. Other UV sources (e.g. Excimer light sources) exist but have reportedly either a very short life time (<500 hours) or a very low energy efficiency (in the order of 1%).

The Hg based low pressure light sources typically have an energy efficiency of above 30% for large light sources, but when these light sources become small the energy efficiency drops; small light sources (<10 cm long) may typically have an energy efficiency of 5-10%.

A serious drawback with Hg light sources is that the light source does not turn fully on immediately, i.e. the flux of photons in the UV-range increases slowly over a period of time until it has reached its steady state condition. This turn-on (warm-up) time may typically be in the order of 2-5 minutes.

During the turn-on time the disinfection system is not fully operational and, for example in a water (or other fluids) disinfection system, the water cannot be used. For air purification the air is not fully disinfected. A curing system for hardening of special glues will not be operational. Similar obvious effects apply to all applications, specifically apparent in the case where these systems are frequently turned on and off, i.e. the disinfection functionality is only needed intermittently. There is thus a desire to provide further enhancements to such a disinfection system, specifically for improving the overall usability and for reducing the effective energy consumption of the system.

SUMMARY OF THE INVENTION

According to an aspect of the invention, the above is at least partly alleviated by a system for treating a fluid, comprising a container arranged to receive an amount of a fluid, a first UV light source contained within the container, a second UV light source contained within the container, and an electrical power supply operatively associated with the first and the second UV light source, the electrical power supply arranged to provide electrical power to the UV light source for treating the amount of the fluid received within the chamber using at least one of the first and the second UV light source, wherein only the second UV light source is an UV mercury based light source, the electrical power supply is configured to activate the first and the second UV light source, and the electrical power supply is configured to selectively deactivate the first UV light source based on a predetermined condition.

The present invention is based on the understanding that the sole use of a mercury based UV light source is not always preferred, for example due to its relative long turn-on time. Accordingly, by means of the invention an additional UV light source is included (i.e. the first UV light source), where the additional UV light source is selected with focus on an in comparison short turn-on time and not being a mercury based UV light source, this making it possible to maximize the effectivity and flexibility of the overall system. The expression "mercury (Hg) based UV light source" used within the context of the invention should be interpreted broadly, and may include any type of UV light source having some form of mercury included for UV light excitation, such as e.g. a fluorescent UV light source, a CFL UV light source, etc. The expression "fluid" used in the context of the invention should also be interpreted broadly and may include any type of fluid needed to be disinfected, e.g. water.

In comparison, when for example the disinfection functionality is only needed intermittently, this may according to a prior art approach for example be handled in one of two ways, or a combination thereof. In a first prior art approach, the light source is left on always, even when the disinfection functionality is not needed. This will accordingly result in an in comparison high overall energy consumption. In addition, for a system arranged for treatment of water, when water is not flowing, the water will be warm or even hot the first time when turned on. Furthermore the lifetime of the system will be much shorter than it would be if the light source was turned off whilst no disinfection operation is necessary, i.e. when the water is not flowing. A light source with a lifetime of 9 000 hours which is typical, will last approximately one year if left turned on. As an example, if the system is only used six hours per day in total, it will consume four times (24/6) more energy than actually needed and have four times shorter life time in comparison to the case where the light source would only be used when needed.

In a second prior art approach the system would not be operational until the above mentioned turn-on time has passed and the user must simply wait for the turn on time to lapse. This may not be practical, for example a user will not have a desire to wait two-five minutes to pour a cup of water. In industrial applications the impact on productivity may likewise be severe. Also in this case, the energy during the turn-on phase is wasted as it does not result in the desired disinfection. The lifetime is reduced proportionally (i.e. with the ratio of turn-on time and operational time) and the energy consumption is increased in the same manner. In addition, as the water during the turn-on up phase of an Hg light source cannot be used it must either be recycled for re-use or the water consumption will rise correspondingly.

From above, it is understood that the predetermined condition for example may be selected to be for example based on a predetermined time period, for example selected based on a warm-up or turn-on time period for the mercury based UV light source, e.g. as compared to when both the first and the second UV light sources are activated simultaneously, etc. However, the predetermined condition may also relate to a measured UV intensity level within the container, for example measured using a therefore provided sensor. The first UV light source may in such a case be allowed to be selectively activated for producing an amount of UV light e.g. matching the difference between the amount of UV light currently produced by the second UV light source and a desired amount of UV light.

In a preferred embodiment of the invention, the first UV light source comprises at least one of a field emission light source (FEL), an UVC Light Emitting Diode (LED) or an Excimer lamp. It is understood that the first UV light source may comprise e.g. a plurality of LEDs and/or a combination of light sources based on different technologies to suit the application. That is, emerging technologies, such as field emission light sources (FEL) and UVC Light Emitting Diodes (LEDs), offer turn on times that are in the order of milliseconds, mainly governed by the electronic drive unit. UVC-LEDs currently are being developed but are at this time exhibiting reportedly very short life times and very low energy efficiencies. Significant efforts are being used in order to improve this and will surely and eventually be successful. Field emission light sources may have life times in the order of 2000-6000 hours depending on the desired power density and have been measured to reach efficiencies around 10%, albeit 4-5% in the UVC region (which is the relevant region for germicidal applications).

Both technologies are thus not delivering the same fundamental life time nor the same fundamental energy efficiency as large Hg light sources, but as will be shown below the fact that the light sources turn on within fractions of a second has such an impact on intermittent systems that these intrinsic characteristics become less important. In addition, both LED and FEL may be controlled to be dimmable, a characteristic that may further increase these advantages, e.g. in relation to compensating for the above mentioned difference between a desired UV light level and what is currently produced by the second UV light source.

Accordingly, by means of the invention, it is possible to activate the first UV light source, (e.g. being an FEL, an UVC-LED or an Excimer lamp) where the first UV light source is in comparison to the mercury based UV light source quickly activated. The second UV light source (i.e. the mercury based UV light source) has longer life time and higher energy efficiency than the first light source. The system is arranged so that, when the desired disinfection should start, the first light source is turned on, thus giving full disinfection functionality immediately. At the same time, the slow starting Hg light source is also turned on and once this light source has reached its full UV output after the turn-on time, the first light source is turned off. This way the system will start operating immediately, the energy consumption over all is significantly lower, and the light source dependent system life time is increased significantly.

To illustrate this two examples are used below, comparing an intermittent system using a Hg light source with a FEL UV source to a system using only a medium size typical low pressure Hg light source used in smaller water disinfection systems today. In the latter case the light source is always turned on. FEL light sources are used as examples, but could (using appropriate data) equally well be UV-LEDs or Excimer light sources or similar.

In the first example the Hg light source is a 21 cm long 14 W low pressure light source and has an energy efficiency of 18%. Its flow rate of water is 9 l/minute resulting in a disinfection ratio of 1:1 000 000, i.e. only one bacteria out of one million survive. This is commonly referred to as "log 6", i.e. the logarithm of $10^6$. The disinfection is thus 99.9999%. The turn on time is 3 minutes. Its life time is 9 000 hours.

The FEL light source in this combined system needs to be powered with 22.5 W in order to sustain a flow of 9 l/minute with a disinfection of log 6. Its life time is 2000 hours. The system is used to disinfect water during 10 minutes, 24 times per day (once per hour). Some key results, describing the advantages with the invention are described in the table below.

|  | Hg light source | Hg light source + Instant On Light source |
|---|---|---|
| Flow rate (liters/minute) | 9 | 9 |
| Disinfection time (minutes) | 10 | 10 |
| Number of disinfection operations per day | 24 | 24 |
| Energy consumption per year (kWhrs) | 123 | 30 |
| Light source dependent System life time (years) | 1.03 | 4.57 |

In the second example a larger and more efficient (30-35%) efficient Hg light source is used at 40 W, a flow rate of 40 l/minutes and achieving a disinfection of log 6. The FEL light source in this combined system needs to be powered with 100 W in order to sustain a flow of 40 l/minute with a disinfection of log 6. Its life time is assumed to be 2000 hours. A similar comparison is shown in the table below.

|  | Hg light source | Hg light source + Instant On Light source |
|---|---|---|
| Flow rate (liters/minute) | 40 | 40 |
| Disinfection time (minutes) | 20 | 20 |
| Number of disinfection operations per day | 10 | 10 |
| Energy consumption per year (kWhrs) | 350 | 79 |
| Light source dependent System life time (years) | 1.03 | 6.58 |

From the above examples it is obvious that the system combining a light source that turns on immediately with the commonly used Hg light sources results in less overall energy consumption and significantly prolonged system life time (assuming no other part than the light source breaks). This in turns will require much less maintenance costs as well as costs for spare light sources. With the additional advantages mentioned above such a system may be very useful and beneficial.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
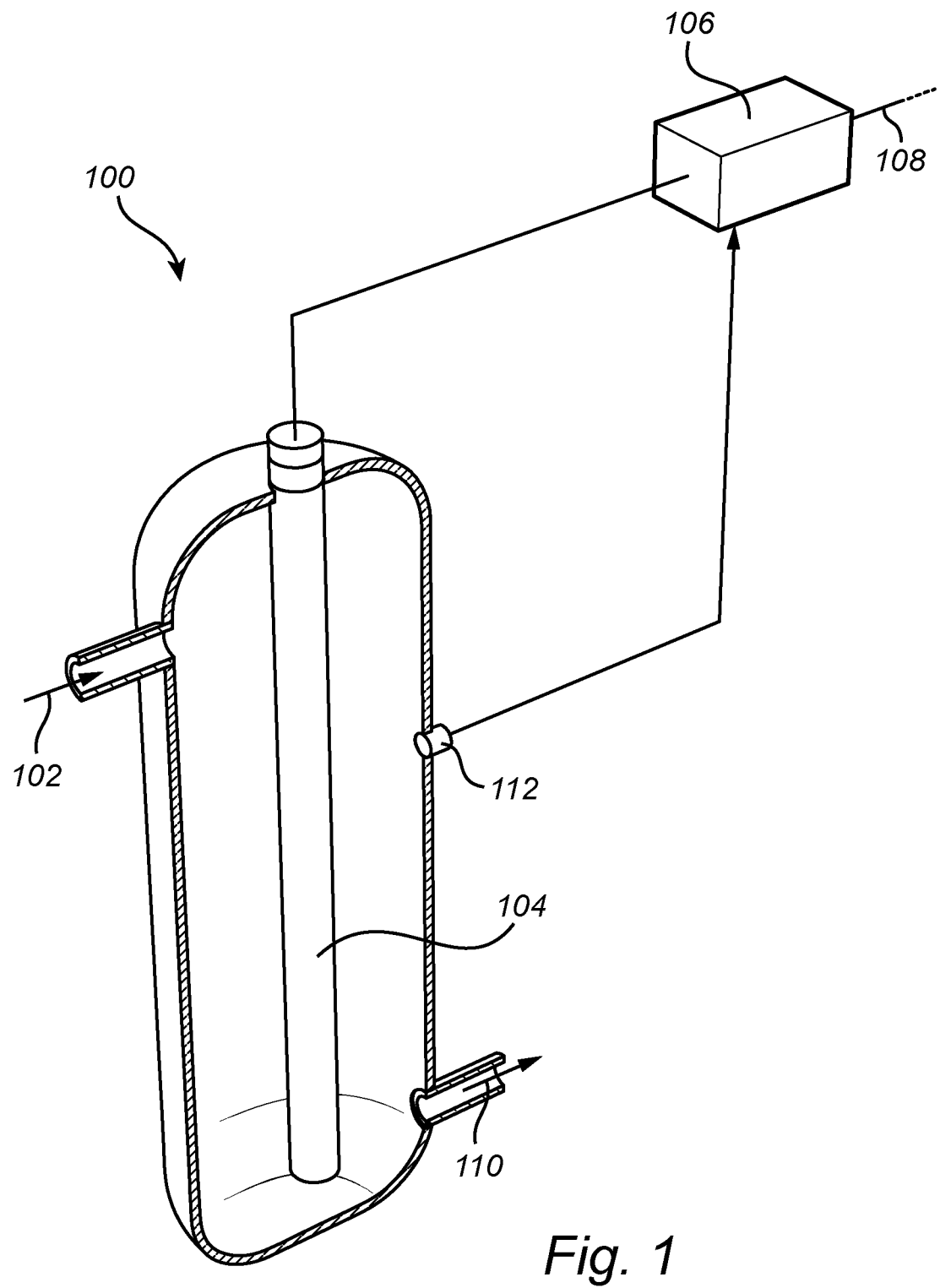
FIG. 1 conceptually illustrates a prior art system for treating a fluid.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

The implementation of a disinfection system combining commonly used Hg light sources with UVC light sources that reach full UVC power output more or less instantly such as UVC-LEDs and FELs is described below for a fluidic disinfection system application. Other applications such as air disinfection, surface disinfection, curing of glues etc., are equally possible and the system implementations described are equally valid. It is also obvious to the skilled person that scaling and different combinations of the described implementations are straightforward. As an example, the figures are showing light sources of similar size and shape for practical reasons, but they may in fact have completely different sizes as well as different form factors. Further more, there may be additional light sources in such systems.

Referring now to the drawings and to FIG. 1 in particular, there is illustrated a typical simple fluidic UV disinfection system 100 of the current state of the art is shown in cross sectional view. It should be noted that the complete system usually may contain filters of different kinds as well as other components. Here only the UV disinfection section is described.

A fluid, such as water, enters the disinfection tube through the inlet 102 into a container arranged to receive an amount of the fluid. A light source 104, most commonly a mercury (Hg) based UV light source, is turned on and energized by an electronic drive unit (ballast) 106. The lamp 104 is commonly additionally protected by a UV transmitting sleeve (not shown, applicable to all embodiments) to prevent Hg to enter the water should the Hg light source break. The disinfection tube may in some embodiment comprise various structures or means to provide a turbulent flow in order to further ensure that all organisms are being subjected to an as large amount of UV radiation as possible, such structures and means also not shown. The electronic drive unit 106 is in turn connected to a power supply 108, such as a wall electrical outlet or similar. The electronic power supply may further be integrated with the disinfection tube or the light source. The water passes the light source 104 and exits through an outlet 110. The UV intensity may be monitored by an UV sensor 112, connected to the electronic drive unit 106 which is safeguarding the system for adequate UV intensity to ensure adequate disinfection. The electronic drive unit 106 may further control a variable valve (not shown), thus controlling the flow rate by using the UV intensity to determine its maximum value. Further sensors may comprise temperature and pressure (not shown here).

Figure 2A:
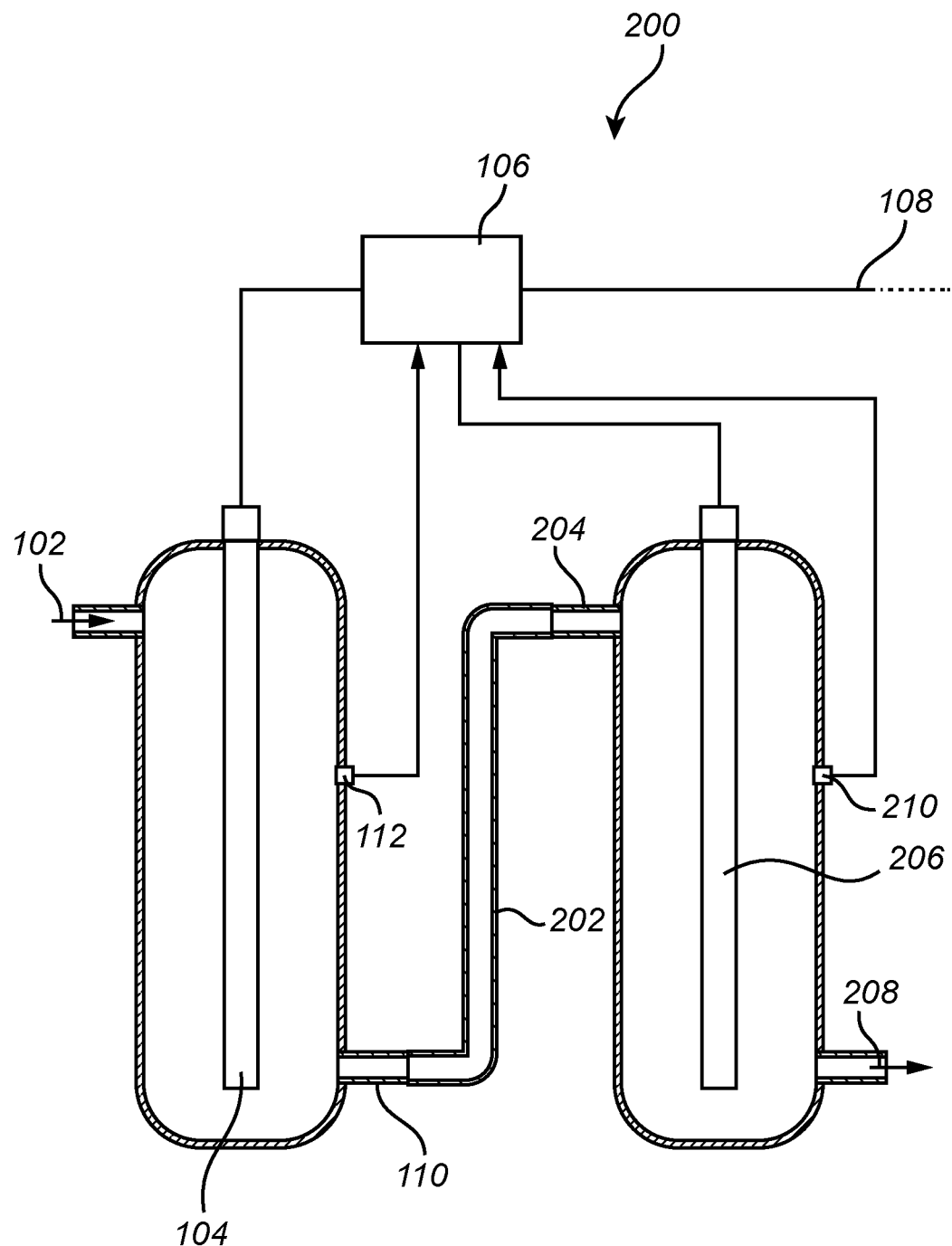
FIG. 2a provides a first currently preferred embodiment of the inventive treatment system, and FIG. 2b illustrated the UV excitation achieved by the inventive system.

Now turning to FIG. 2a, showing a first preferred embodiment a treatment system 200 according to the present invention. This embodiment is the most straight forward and consist of two similar systems connected in series, one with the Hg light source (i.e. the second UV light source as defined above), the other with a light source that turns on quickly (e.g. directly or for example within a couple of seconds) (i.e. the first UV light source as defined above). The order of the two can be different as compared to what is shown in FIG. 2a. It should be noted that the first stage in the water disinfection is similar to what is outlined in FIG. 1 above and thus not further discussed.

Water exits from the water outlet 110 into a connecting pipe or hose 202 leading to a water inlet 204 of the second stage. The water is passing past an additional UV disinfecting light source 206 and exits through a water outlet 208. The Hg light source 104 and the additional UV light source 206 are powered by the electronics drive unit 106, which may or may not be integrated to contain drive units for both light sources (as shown) or be separated (not shown). The electronic drive unit 106 may further be partitioned in several ways, including partially or fully being integrated with e.g. the light sources 104, 206. Other possibilities for partitioning the electronic drive unit 106 are numerous and within the scope of the invention. The intensity of the additional UV light source 206 may be monitored by an additional UV sensor 210. The intensity is fed back to the electronic drive 106 unit which may comprise the functionality for controlling the intensity of the additional UV light source 206.

When the treatment system 200 starts (i.e. water starts to flow) an electric signal (not shown) is given to the electronic drive unit that will immediately turn on both the Hg light source 104 and the additional UV light source 206. The additional UV light source 206 is of a type that quickly, as compared to the UV light source 104, will reach its full UV output power. When the Hg light source 104 has reached its full UV power output, for example as measured by the UV sensor 112, the additional UV light source 206 may be switched off. Alternatively, the sensor signal from the UV sensor 112, monitoring the UV intensity of the slow starting Hg light source 104, is used to gradually reduce the intensity from the additional UV light source 206. The intensity from the additional UV light source 206 is monitored by the UV sensor 210.

Figure 2B:
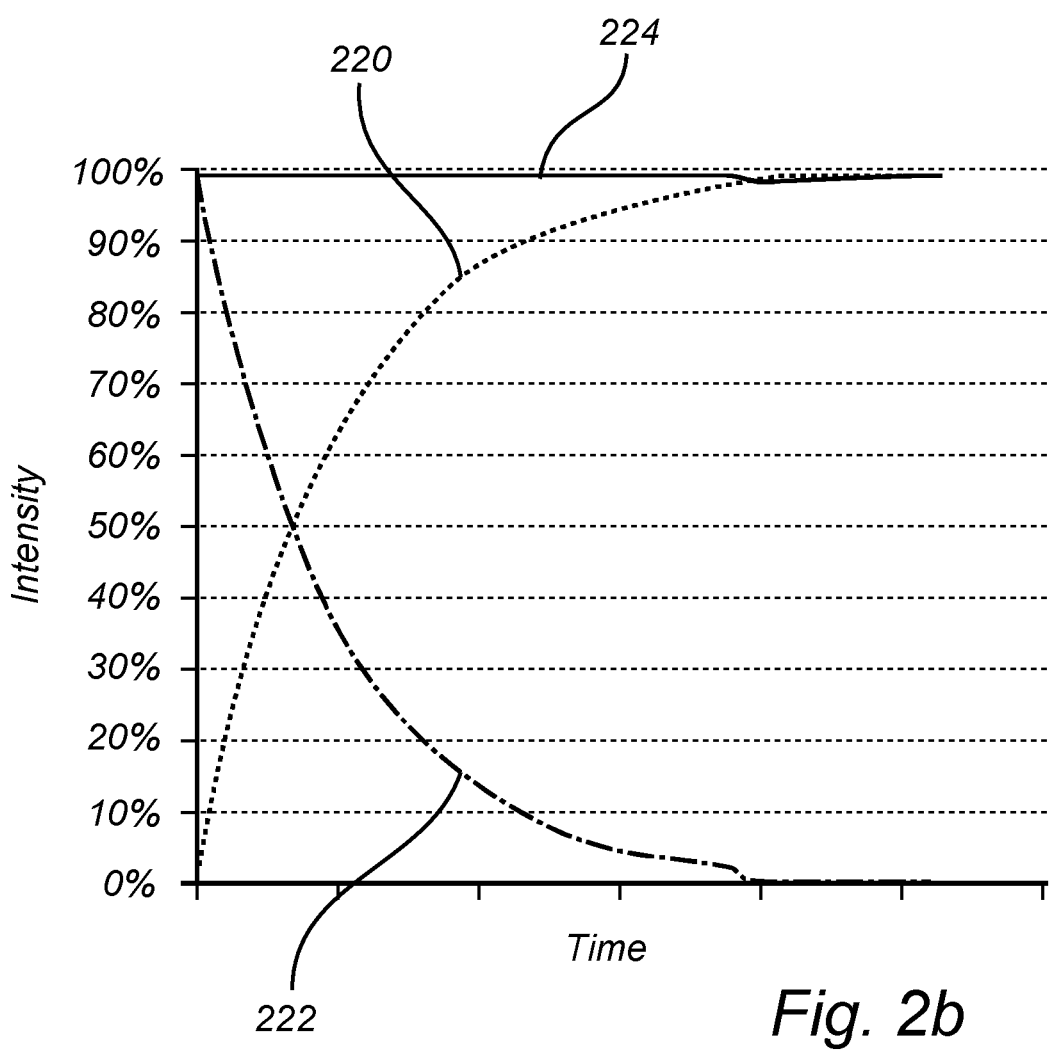

As shown in FIG. 2b, it is possible to use the sum of these two sensors 112, 210 to maintain an essentially constant UV intensity in total. The UV intensity measured by the sensor 112 is referred to as 220, the UV intensity from the sensor 210 is referred to as 222, and the total UV intensity is referred to as 224. Since the power for the additional UV light source 206 is reduced gradually there is another additional significant saving of energy and increase of life time.

Figure 3:
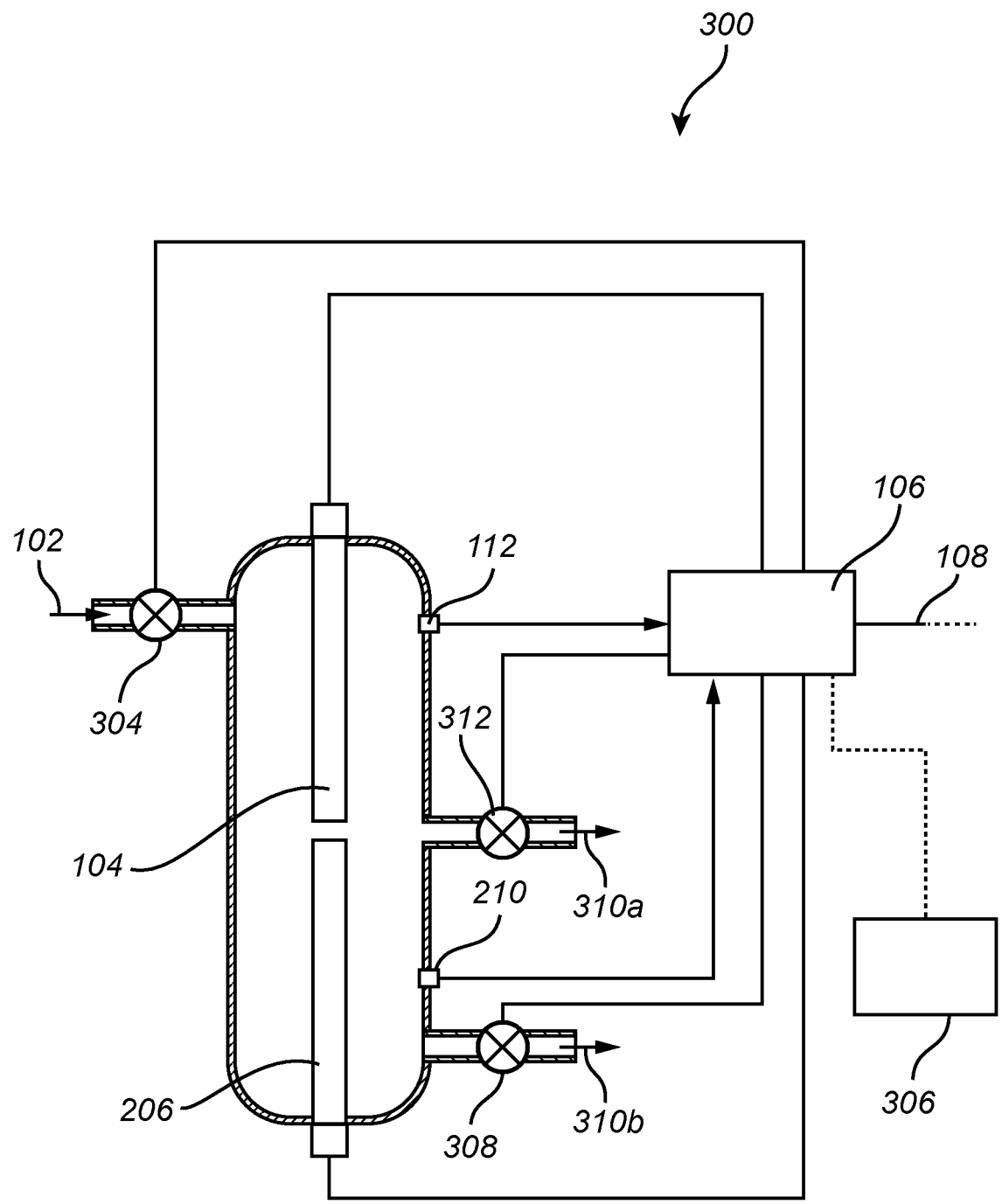
FIG. 3 illustrates an alternative implementation of the inventive system for treating a fluid.

A second preferred embodiment of the present invention is conceptualized in FIG. 3 and the discussion below. In this case, the two light sources 104 and 206 are integrated into one disinfection tube/arrangement 300. This embodiment will be less costly and will enable a "boost" function where a significantly higher flow may be enabled for a short time (however the above advantages are lost in this operational mode). Specifically, water enters the water treatment arrangement 300 through an inlet 102 controlled by an inlet valve 304. The electronic drive unit 106, which may be using a remote control device 306 (wire bound or wireless) will turn on both the Hg light source 104 and additional UV light source 206 as soon as the input valve 304 is open. The electronic drive unit 106 will also open an output valve 308, ensuring that the fluid flows by both light sources 104, 206, now leaving the disinfection tube through an outlet 310b. It may be advantageous to ensure short delays between for example opening the output and input valve. The UV intensity of the slow starting Hg light source 104 may be monitored by the UV sensor 112, being connected to the electronic drive unit 106. Correspondingly the UV intensity of the instantly starting light source 206 may be monitored by the UV sensor 210, also connected to the electronic drive unit 106.

A similar adjustment during the startup phase as outlined in the description of FIG. 2 above may be adapted. Once the slow starting Hg light source 104 has reached its full intensity a further valve 312 may be opened, the valve 308 closed and the additional UV light source 206 may be turned off. In this embodiment it may be equally possible to leave valve 308 open and not open valve 312. However this embodiment enables an operational mode where both light sources are running and both valves 308 and 312 are open, thus providing a significantly higher flow rate of the fluid, should this be desired, as the fluid may now leave the system from both outlets 310a and 310b.

In summary, the present invention relates to a system for treating a fluid, comprising a container arranged to receive an amount of a fluid, a first UV light source contained within the container, a second UV light source contained within the container, and an electrical power supply operatively associated with the first and the second UV light source, the electrical power supply arranged to provide electrical power to the UV light source for treating the amount of the fluid received within the chamber using at least one of the first and the second UV light source, wherein only the second UV light source is an UV mercury based light source, the electrical power supply is configured to activate the first and the second UV light source, and the electrical power supply is configured to selectively deactivate the first UV light source based on a predetermined condition.

By means of the invention it is possible to optimize the use of the mercury based UV light source, resulting in an overall improved flexibility and energy consumption of the water treatment.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A system for treating a fluid, comprising:
   a single container arranged to receive an amount of a fluid;
   a first UV light source contained within the container;
   a second UV light source contained within the container; and
   an electrical drive unit and associated control device operatively associated with the first and the second UV light source, the electrical drive unit arranged to provide electrical power to the UV light source for treating the amount of the fluid received within the chamber using at least one of the first and the second UV light source,
   wherein only the second UV light source is an UV mercury based light source, the electrical drive unit and associated control device are configured to provide electrical power to both the first and the second UV light source for a first time period, the electrical drive unit and associated control device are configured to selectively deactivate the first UV light source based on a predetermined condition such that the electrical drive unit provides electrical power to the second UV light source but not the first UV light source for a second period subsequent to the first period, and the predetermined condition is based on a warm-up period for the second UV light source.

2. The system according to claim 1, wherein the first and the second UV light source are activated essentially simultaneously.

3. The system according to claim 1, wherein the predetermined condition is a predetermined time period.

4. The system according to claim 1, further comprising a sensor for measuring a UV intensity level within the container.

5. The system according to claim 4, wherein the predetermined condition is related to a measured UV intensity level within the container.

6. The system according to claim 1, wherein the first and the second UV light source at least partially extends into the amount of the fluid received within the container.

7. The system according to claim 1, wherein the first UV light source comprises at least one of a field emission based light source (FEL), an UVC Light Emitting Diode (LED), and an Excimer lamp.

8. The system according to claim 1, wherein the container is divided in a first and a second portion, the first portion holding the first UV light source and the second portion holding the second UV light source.

9. The system according to claim 4, further comprising an electronic drive unit in communication with the sensor and configured for controlling the selective activation of the first and the second UV light source.

10. The system according to claim 1, wherein the control device comprises a remote control device.

* * * * *